Patented Nov. 30, 1937

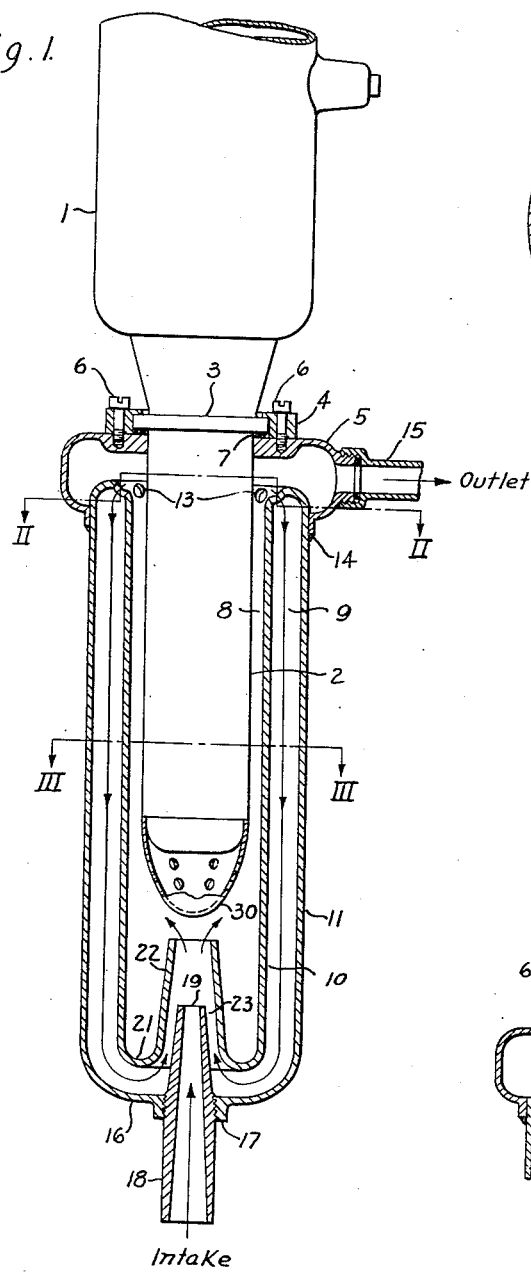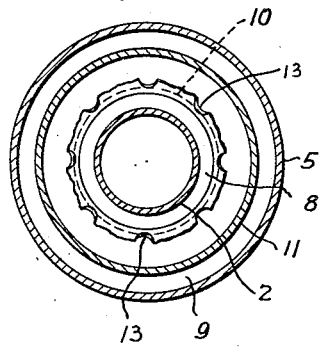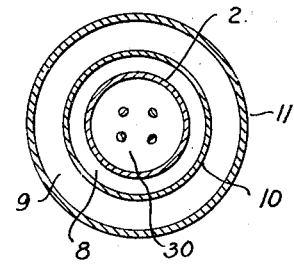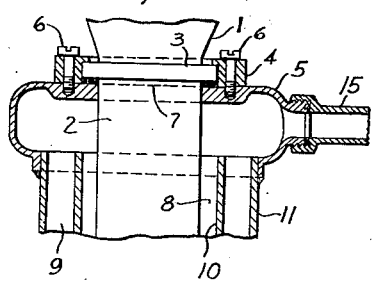

2,100,747

UNITED STATES PATENT OFFICE 2,100,747

RECIRCULATING WATER JACKET

Ilia E. Mouromtseff, Wilkinsburg, Pa., assignor to Westinghouse Electric & Manufacturing Company, East Pittsburgh, Pa., a corporation of Pennsylvania Application January 4, 1936, Serial No. 57,581

7 Claims. (Cl. 250—27.5)

This invention relates to water jackets and particularly to water jackets adapted for cooling the anode of high power tubes such as sending tubes in a radio station.

It is an object of this invention to provide for a circulation of the water through the jacket in such a way that a portion at least of the water repeats its travel over the anode.

It is a further object of this invention to provide for more effectively cooling the anode than has been accomplished with previous water jackets.

It is a further object of this invention to provide for the recirculation of the water without materially increasing the head required for forcing the water through the system.

Heretofore difficulty has been met with high power tubes in many instances because it has not been possible to drive cooling water past them fast enough to keep the hot anode from causing the water to boil.

Moreover there are many situations where the large quantity of water needed is not available. This invention enables the smaller amount of water actually available to serve. Even when there is a rise in temperature of only a few degrees of the water during its passage through the jacket, there may be, in certain cases, boiling of the water at certain spots of the anode surface. When a highly negative grid is used, giving a marked focusing effect to the electron stream, this is particularly likely to occur.

It is an object of the invention to overcome the difficulty by causing the water in contact with the anode to move rapidly enough to effectively remove bubbles of steam and to prevent local boiling, without very materially increasing the quantity of water required for the system.

By this invention not only may a smaller pump be made to serve in a given case but also it becomes possible to install more or larger power tubes than heretofore was considered possible. The amount of water being regarded as a limiting factor; for example, on board ship. By causing the small amount of water to be used with greater efficiency the larger supply of water is rendered unnecessary.

Likewise it is an object of this invention to enable sending stations to be enlarged, using more or bigger power tubes with the same quantity of available cooling water than before this invention was regarded as only sufficient for the small station.

Another object of the invention is to enable sending stations with a large number of water-cooled tubes to operate more economically than heretofore.

Other objects of the invention and details of the structure will be apparent from the accompanying drawing and the detailed description.

In the drawing:

Figure 1 is a side elevational view, partly in section of a portion of the tube and a section of the associated water jacket.

Fig. 2 is a sectional view taken along the line II—II of Fig. 1.

Fig. 3 is a sectional view taken along the line III—III of Fig. 1; and

Fig. 4 is a vertical section of the upper part of the jacket showing a modification.

The interior structure of the tube is not shown in the drawing because it is unrelated to the present invention.

The tube 1 is provided with an anode 2 of conventional structure. A flange 3 on the exterior of the anode is secured by welding, brazing or in any other suitable manner. The water jacket is secured thereto by a clamping ring 4 made with screw openings therein and secured to the end casing 5 by screws 6. A gasket 7 ensures a water-tight joint.

The jacket comprises a double wall including an inner member 10 and an outer member 11, thus providing an inner jacket space 8 between the inner member 10 and the anode 2 and an outer jacket space 9 between the two members of the wall. At the end of the jacket nearest the end casing 5, wall 10 is connected to the wall 11 by any suitable structure which leaves abundant passageway between jacket space 8 and jacket space 9. There may be a curved portion connecting them and containing a ring of holes 13, as illustrated in Fig. 1. In the alternative structure shown in Fig. 4, which may be preferred in many situations, the wall 10 ends short of the end casing 5 and several radial webs may be provided bracing the wall 10 from the upper part of the wall 11. The end casing 5 is welded or otherwise secured by a fluid-tight joint to the outer member 11 of the double wall as shown at 14. The end casing is also provided with a threaded orifice into which the outlet 15 is connected.

At the other end of the jacket, the outer member 11 is curved inward to form an end portion 16, in the middle of which a threaded boss 17 is provided for a screw connection with an intake pipe 18. The end of the intake pipe is tapered to form a nozzle 19 which extends beyond the nearer re-curved end of the cylindrical part of the inner member 10 of the double wall. The end of the inner member as shown at 21 forms a tapered nozzle 22 concentric with the nozzle 19. If desired the nozzle 19 may be made adjustable in the base 17 to vary the width of space 23 and thus vary the effect of the flow through the nozzle 19 upon the flow through the space 9. The nozzle 22 extends inwardly beyond the end of the nozzle 19 and an annular space 23 is provided between them. A stream-line formed shield 30 may be provided upon the end of the anode 2 but if desired this shield may be omitted.

In the operation of the device the intake is connected to the pump or other source of water under pressure by a long pipe including a coiled portion of insulating material, and the outlet 15 is connected through a similar long pipe and coil to the drain or to the reservoir which supplies the intake side of the pump. A potential of several thousand volts is usually impressed upon the anode and thus upon the water jacket but the long columns of water and the insulating coils sufficiently insulate this high potential body.

The water enters through the pipe 18 and the nozzle 19. Passage of water at a high velocity through the nozzle 19 and the nozzle 22 causes a flow of water through the passage 23. The suction effect of the velocity of the jet of water emerging from the nozzle 19 acts to establish this flow of water through the passage 23.

The water thus introduced into the space 8 within the inner wall 10 passes along the surface of the anode 2 at sufficient velocity to insure that it will not boil and that bubbles of steam will not collect on the surface of the anode.

Pressure in the interior of the end casing 5 assists in establishing such flow because the velocity in the inner jacket space 8 is high while that in the end casing 5 is relatively low. Consequently the pressure in the end casing 5 is larger than at the nozzle 19. This is another aspect of the cause of the flow through the openings 13 and passage 23.

Not all of the water passes through the openings 13 but some of it emerges into the end casing 5 and is there passed through the outlet 15 into the column of water, including an insulating coil which leads from the high potential jacket to the drain or to the reservoir from which the pump supplies the water to the intake 18.

If desired a shield 30 may be provided on the end of the anode to prevent the formation of an eddy there. The eddy if formed increases the hydraulic resistance uselessly. The shield is not necessary to the operation of the device and may be omitted.

The quantity of water needed to cool a tube when equipped with a jacket of this kind is considerably less than the quantity required by the water jackets heretofore used, and the head for maintaining the flow of water through the jacket herein proposed, even though such flow includes a re-circulation of the water is but slightly greater than that required by previous jackets. Moreover, the long columns of water with their insulating coils require a much greater head than the water jacket either of the present form or of old forms. The relative increase in the requirement for the head is therefore small and is more than compensated by the diminution in the quantity of water required.

The flow of water through a confined space, such as the inner jacket space 8, will be along parallel lines until a certain critical velocity is surpassed. The flow will then become turbulent and will be more turbulent as the velocity increases. When the flow is parallel, only the water adjacent to the anode wall is effective in cooling it. Because water is a poor conductor of heat, only a thin film of water is able to have any cooling effect on the anode while parallel motion prevails. If, on the other hand, turbulent motion is set up, the wall thickness of the water in the inner jacket space 8 can produce a cooling effect. The cooling effect of the water is thus greatly increased whenever the flow becomes turbulent.

The width of the jacket space 8 has, of course, a considerable effect on the velocity. The smaller this width the greater will be the velocity. However, mechanical considerations, such as the necessary clearance in the parts and the necessary provision for possible distortion during heating, fix a certain limit below which the width of the inner jacket space may not be reduced. Within this space the velocity of the water will be high because of the principles already explained. The high velocity, because it tends to produce turbulent flow, increases the cooling effect of the water.

The cooling effect of water flowing over a uniformly heated surface is proportional approximately to the 0.7 power of the velocity, but this law does not hold if the surface to be cooled is non-uniformly heated. The anode, particularly if the grid is strongly negative, is heated irregularly, there will be spots of considerably higher temperature than adjacent spots. On said spots bubbles of steam are apt to form even though the water leaving the water jacket is cold. By increasing the velocity of the water in the inner jacket space its mechanical effect in removing such steam bubbles is greatly increased.

The results obtained by the double-walled jacket are substantialy different from what can be obtained by merely increasing the power of the water pump and thus driving a greater quantity of water per hour through an ordinary water jacket. The improved cooling result enables one to dispense with a large pump for cooling the tubes in a given installation, or it will enable one to cool more tubes with a given sized pump than has been heretofore possible. Moreover, it is possible for such a double-walled jacket to install power tubes where the avilable quantity of water is less than could supply such an installation with the style of water jacket heretofore used.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A cooling jacket for an elongated body comprising a double wall providing an inner jacket space and an outer jacket space, a nozzle adjacent one end of said body directly providing for flow into said inner jacket space and said inner and outer space having an opening from one to another at said nozzle whereby flow is induced from said outer jacket space into said inner jacket space, said jacket having a passageway adjacent the other end of said elongated body through which flow may occur from said inner jacket space into said outer jacket space and means adjacent said passageway for permitting emergence from said jacket.

2. A cooling jacket for an anode comprising a double wall providing an inner and an outer jacket space, an end casing surrounding said double wall at one end and having fluid-tight joints with the anode and with the outer member of the double wall, means for bracing the inner member from the outer member adjacent said end, said jacket having a passageway between said inner and outer jacket spaces adjacent said means and also a passageway between said spaces at the opposite end of said jacket.

3. A cooling jacket for an anode comprising, a double wall providing an inner and an outer jacket space, an end casing surrounding said double wall at one end and having fluid-tight joints with the anode and with the outer member of the double wall, the two members of said double wall being rigidly connected adjacent said end casing, said connection having passageways uniting the inner and outer spaces.

4. A cooling jacket for an anode comprising a double wall providing an inner and an outer jacket space, a bracing connection uniting the members of said wall adjacent one end of the jacket, an end casing surrounding said connection and having a junction with the outer member and a fluid-tight junction with the anode, and said connection having passages between the two jacket spaces.

5. A cooling jacket for an anode, a double wall providing an inner and an outer jacket space, a re-curved partition uniting the members of said wall at one end of the jacket, and having passages therethrough, an end casing surrounding said re-curved partition and having a junction with the outer member and a junction with the anode, means for providing circulation through the two jacket spaces including an inlet nozzle at the end opposite the re-curved partition and an outlet from the end casing, means adjacent the nozzle for inducing flow from the outer into the inner jacket space and the said passages diverting at least a portion of the flow into the outer jacket space.

6. A cooling jacket for a body to be cooled having a partition providing an outer jacket space and an inner space containing said body and an inlet for circulating a flow of cooling fluid through said spaces, said partition having a curved opening reentrant to said inner space and axially aligned with said inlet, said curved opening being intermediate said inlet and said inner space containing said body.

7. A cooling jacket for a body to be cooled having a partition providing an outer jacket space and an inner space containing said body and means for causing a circulating flow of cooling fluid through said spaces, said means including a nozzle through which the cooling fluid enters said jacket, said partition having a curved opening reentrant to said inner space and axially aligned with said nozzle, said curved opening being intermediate said nozzle and said inner space containing said body.

ILIA E. MOUROMTSEFF.